United States Patent [19]
Nukada et al.

[11] Patent Number: 5,512,674
[45] Date of Patent: Apr. 30, 1996

[54] PROCESS FOR PREPARING TITANYL PHTHALOCYANINE CRYSTAL BY SOLVENT DILUTION

[75] Inventors: Hidemi Nukada; Akihiko Tokida; Yasuo Sakaguchi; Katsumi Daimon; Katsumi Nukada, all of Kanagawa, Japan

[73] Assignee: Fuji Xerox Co., Ltd., Tokyo, Japan

[21] Appl. No.: 161,496

[22] Filed: Dec. 6, 1993

Related U.S. Application Data

[63] Continuation of Ser. No. 670,778, Mar. 19, 1991, abandoned.

[30] Foreign Application Priority Data

Mar. 20, 1990 [JP] Japan ......................... 2-68091

[51] Int. Cl.$^6$ ............................................ C09B 47/04
[52] U.S. Cl. .......................... 540/141; 540/143; 430/78
[58] Field of Search .............................. 540/141, 143; 430/78

[56] References Cited

U.S. PATENT DOCUMENTS

| | | | |
|---|---|---|---|
| 3,265,699 | 8/1966 | Jaffe | 260/279 |
| 4,994,566 | 2/1991 | Mimura et al. | 540/141 |
| 5,039,586 | 8/1991 | Itami et al. | 540/141 |
| 5,225,551 | 7/1993 | Duff et al. | 540/141 |

*Primary Examiner*—Mukund J. Shah
*Assistant Examiner*—Pavanaram K. Sripada
*Attorney, Agent, or Firm*—Finnegan, Henderson, Farabow, Garrett & Dunner

[57] ABSTRACT

A process for preparing a titanyl phthalocyanine crystal showing at least one diffraction peak at a Bragg angle ($2\theta \pm 0.2$) of 27.3° is disclosed, which comprises dissolving or suspending titanyl phthalocyanine in concentrated sulfuric acid to form a solution or a slurry and diluting the solution or slurry with an alcohol solvent, an aromatic solvent, a mixed solvent of an alcohol solvent and water, a mixed solvent of an aromatic solvent and water, or a mixed solvent of an alcohol solvent and an aromatic solvent with or without water thereby to precipitate a crystal, and, if desired, treating the precipitated crystal with an alcohol solvent, an aromatic solvent, a mixed solvent of an alcohol solvent and an aromatic solvent or a mixed solvent of an alcohol solvent and/or an aromatic solvent and water. The resulting titanyl phthalocyanine crystal exhibits high photosensitivity and excellent durability as a photoconductive material of an electrophotographic photoreceptor.

6 Claims, 4 Drawing Sheets

PROCESS FOR PREPARING TITANYL PHTHALOCYANINE CRYSTAL BY SOLVENT DILUTION

This is a continuation of application Ser. No. 07/670,778, filed Mar. 19, 1991, now abandoned.

FIELD OF THE INVENTION

This invention relates to a process for preparing a titanyl phthalocyanine crystal useful as a photoconductive material.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

In general, phthalocyanine compounds are known to exhibit several different crystal forms depending on the process of production or the process of treatment. The difference in crystal form is known to have a great influence on their photoelectric conversion characteristics. For example, known crystal forms of copper phthalocyanine compounds include α-, ε-, π-, χ-, ρ-, and δ-forms in addition to a stable β-form. It is known that these crystal forms are capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, a relationship between the crystal form of copper phthalocyanine and electrophotographic sensitivity is described in JP-A-50-38543 (the term "JP-A" as used herein means an "unexamined published Japanese patent application").

With respect to titanyl phthalocyanine, too, various crystal forms have been proposed, including a stable β-form as disclosed in JP-A-62-67094, an β-form as disclosed in JP-A-61-217050, and other crystal forms as disclosed in JP-A-63-366, JP-A-63-20365, JP-A-64-17066, and JP-A1-153757.

However, any of the above-described phthalocyanine compounds proposed to date is still unsatisfactory in photosensitivity and durability when used as a photosensitive material. It has thus been demanded to develop a phthalocyanine compound of new crystal form or a process for easily preparing a phthalocyanine compound of stable crystal form.

SUMMARY OF THE INVENTION

An object of the present invention is to provide a process for easily preparing a stable titanyl phthalocyanine crystal having high photosensitivity.

As a result of extensive investigations, the inventors have found that a titanyl phthalocyanine crystal having a stable crystal form which exhibits high sensitivity and durability as a photoconductive material can be obtained by subjecting titanyl phthalocyanine to a simple treatment, and thus reach the present invention.

The present invention relates to a process for preparing a titanium phthalocyanine crystal showing at least one diffraction peak at a Bragg angle $(2\theta \pm 0.2)$ of 27.3°, which comprises dissolving or suspending titanyl phthalocyanine in concentrated sulfuric acid to form a solution or a slurry and diluting the solution or slurry with an alcohol solvent, an aromatic solvent, a mixed solvent of an alcohol solvent and water, a mixed solvent of an aromatic solvent and water, or a mixed solvent of an alcohol solvent and an aromatic solvent with or without water, thereby to precipitate a crystal. If desired, the precipitated crystal is isolated and further treated with an alcohol solvent, an aromatic solvent, a mixed solvent of an alcohol solvent and an aromatic solvent: or a mixed solvent of an alcohol solvent and/or an aromatic solvent and water.

DETAILED DESCRIPTION OF THE INVENTION

Figure 1:
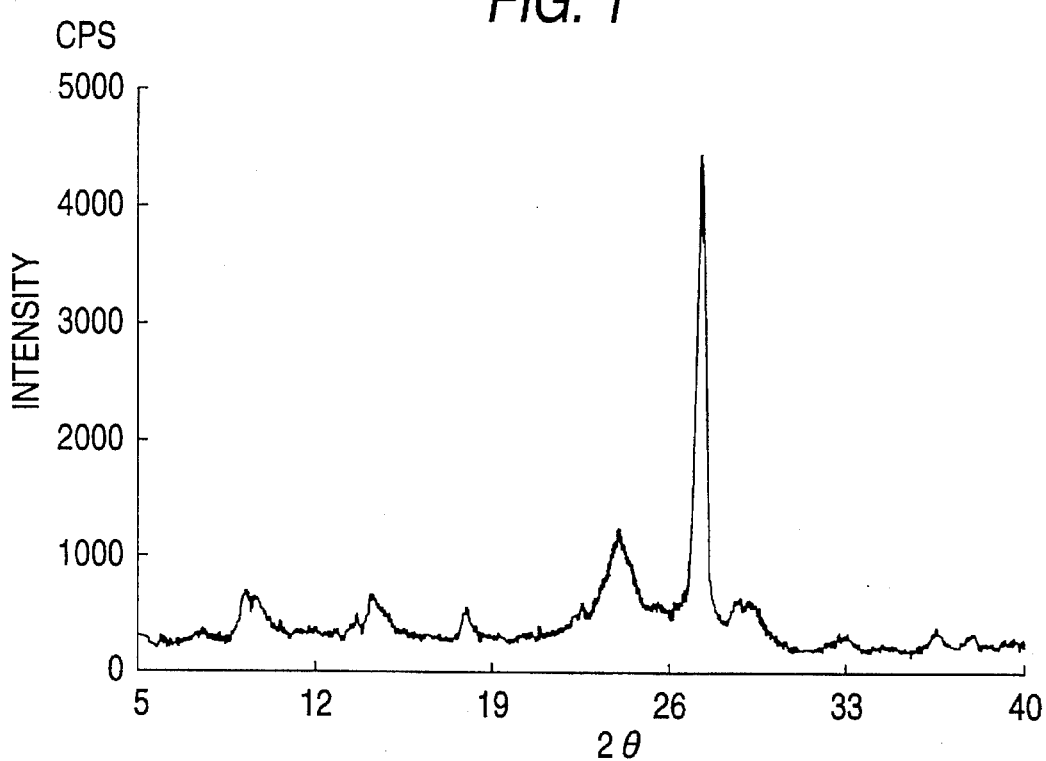
FIGS. 1 through 6 each show the X-ray diffraction pattern (abscissa: Bragg angle (2θ); ordinate: intensity (CPS)) of the titanyl phthalocyanine crystal obtained in Examples 1 through 6, respectively.

Titanyl phthalocyanine which can be used in the process of the present invention is synthesized by a known method as described in U.S. Pat. Nos. 4,664,997 and 4,898,799. For example, it is synthesized by reacting 1,3-diiminoisoindoline with titanium tetrabutoxide, or by reacting 1,2-dicyanobenzene (o-diphthalonitrile) with a titanium compound as shown in the following scheme (1) or (2).

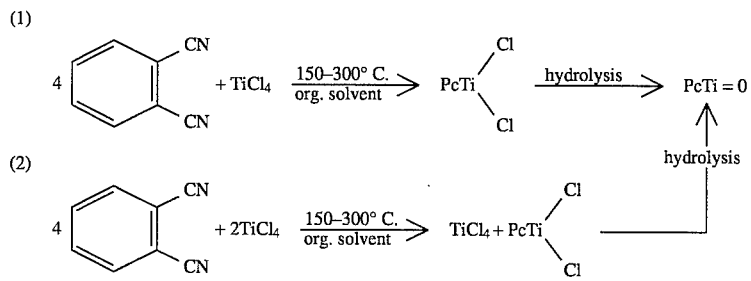

In the scheme, Pc represents a phthalocyanine residue. Namely, 1,2-dicyanobenzene and a titaniumhalide are heated in an inert solvent to react. Examples of the titanium halide include titanium tetrachloride, titanium trichloride, titanium tetrabromide and the like, and titanium tetrachloride is preferably used in view of production costs. As an inert solvent, organic solvents having a high boiling point are preferably used, such as trichlorobenzene, α-chloronapthalene, β-chloronapthalene, α-methylnaphthalene, methoxynaphthalene, diphenyl ether, diphenylmethane, diphenylethane, ethylene glycol dialkyl ethers, diethylene glycol dialkyl ethers, triethylene glycol dialkyl ethers and the like. The reaction is generally performed at 150° to 300°

C. and preferably at 180° to 250° C. After the reaction, the produced dichlorotitanium phthalocyanine is separated by filtration and washed with a solvent as used in the reaction to remove by-products and unreacted starting materials. Then, the resulting product is washed with an inert solvent such as alcohols (e.g., methanol, ethanol, and isopropyl alcohol) and ethers (e.g., tetrahydrofuran and 1,4-dioxane) to remove the solvent which has been used in the reaction and in the subsequent washing step. The resultant product is then subjected to hydrolysis with hot water to obtain titanyl phthalocyanine.

Titanyl phthalocyanine as synthetically prepared above is poured into 1 to 100 times (preferably from 3 to 60 times) of its weight of concentrated sulfuric acid having a concentration of from 70 to 100% (preferably from 90 to 97%) at a temperature of from −20° C. to 100° C. (preferably from 0° to 60° C.) to form a solution or a slurry. The resulting solution or slurry is then poured into a solvent to precipitate titanyl phthalocyanine crystals which are isolated by filtration.

The solvent which can be used for precipitation according to the present invention is selected from an alcohol solvent, an aromatic solvent, a mixed solvent of an alcohol solvent and water, a mixed solvent of an aromatic solvent and water, and a mixed solvent Of an alcohol solvent and an aromatic solvent with or without water. Examples of suitable alcohol solvents are those having-up to 5 carbon atoms such as methanol and ethanol. Examples of suitable aromatic solvents are aromatic hydrocarbons such as benzene, toluene, and xylene; aromatic nitro compounds such as nitrobenzene; aromatic halogen compounds such as monochlorobenzene, dichlorobenzene, trichlorobenzene, and chloronaphthalene; and phenol. In using the mixed solvent, the alcohol solvent/ water volume ratio is less than 100/0 to 10/90, and preferably from 80/20 to 40/60; the aromatic solvent/water volume ratio is less than 100/0 to 1/99, and preferably from 60/40 to 5/95; and the alcohol solvent/aromatic solvent volume ratio is less than 100/0 to more than 0/100, preferably from 90/10 to 50/50 when water is absent, and the alcohol solvent/ aromatic solvent volume ratio is from 1/99 to 99/1 when Water is present and the volume ratio of the total of the alcohol solvent and the aromatic solvent to water is from 90/10 to 10/90, preferably from 80/20 to 40/60.

The amount of the above-described solvent to be used ranges from 2 to 50 times, preferably from 5 to 20 times, the weight of the concentrated sulfuric acid solution or slurry.

The isolated crystal may further be subjected to a solvent treatment to allow the crystal to grow to a desired size (e.g., 0.05 to 0.1 μm) and also to eliminate impurities from the crystal.

The solvent treatment can be carried out by adding the isolated titanyl phthalocyanine crystal to an alcohol solvent, an aromatic solvent, a mixed solvent of an alcohol solvent and an aromatic solvent, or a mixed solvent of an alcohol solvent and/or an aromatic solvent and water, followed by stirring or milling at a temperature of from room temperature to 100° C., preferably from 30° to 80° C., for a period of from 10 minutes to 5 hours, preferably from 10 minutes to 4 hours.

Examples of alcohol solvents and aromatic solvents used for the purpose are the same as those described above, and methanol, ethanol, benzene, toluene, monochlorobenzene, dichlorobenzene, trichlorobenzene, phenol or the like is generally used. In using the mixed solvent wherein the alcohol solvent and the aromatic solvent do not co-exist, the alcohol/water volume ratio is less than 100/0 to 10/90, and preferably less than 100/0 to 50/50; and the aromatic solvent/water volume ratio is less than 100/0 to 1/99, and preferably from 60/40 to 3/97. In the case of using the mixed solvent of an alcohol solvent, an aromatic solvent and water, the alcohol solvent/aromatic solvent volume ratio is from 1/99 to 99/1 and the volume ratio of the total of the alcohol solvent and the aromatic solvent to water is from 100/0 to 1/99 and preferably from 60/40 to 3/97.

The titanyl phthalocyanine crystal obtained by the process of the present invention is a novel crystal showing at least one diffraction peak at a Bragg angle (2θ±0.2) of 27.3°, and the crystal has other diffraction peaks at 24.0°, 18.0°, and 14.3°. Since it has photosensitivity in a wavelength region extending to the longer side, it is very useful as a photoconductive material of an electrophotographic photoreceptor of, for example, a printer utilizing a semi-conductor laser as a light source.

The present invention is now illustrated in greater detail with reference to Examples, but it should be understood that the present invention is not deemed to be limited thereto. All the parts, percents and ratios are by weight unless otherwise indicated. Examples, X-ray diffraction was measured with an X-ray diffractometer RAD-RC manufactured by Kabushiki Kaisha Rigaku, under the conditions given below:

Power of X-ray generator: 18 KW

Target: Cu

Wavelength of characteristic X-rays (CuK): 1/54050 angstrom

Voltage: 40.0 KV

Current: 300.0 mA

Initiation angle: 5.00 degrees

Termination angle: 40.00 degrees

Step angle: 0.020 degrees

SYNTHESIS EXAMPLE

Synthesis of Titanyl Phthalocyanine

To 20 parts of 1-chloronaphthalene were added 3 parts of 1,3-diiminoisoindoline and 1.7 parts of titanium tetrabutoxide, and the mixture was allowed to react at 190° C. for 5 hours. The reaction product was collected by filtration and washed successively with aqueous ammonia, water, and acetone to obtain 4.0 parts of titanyl phthalocyanine.

Figure 7:
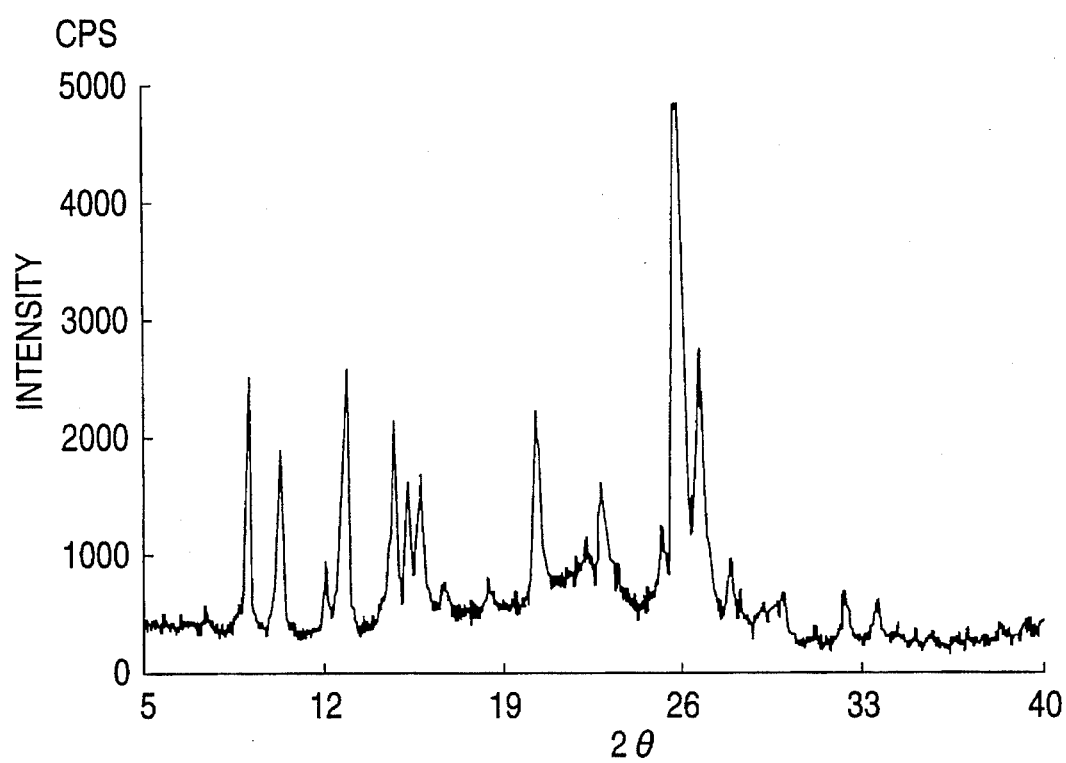
FIG. 7 is an X-ray diffraction pattern of the titanyl phthalocyanine crystal obtained in the Synthesis Example.

A powder X-ray diffraction pattern of the resulting titanyl phthalocyanine crystal is shown in FIG. 7.

EXAMPLE 1

Two parts of the titanyl phthalocyanine obtained in the Synthesis Example were dissolved in 100 parts of 97% sulfuric acid at 5° C., and the solution was poured into an ice-cooled mixed solvent consisting of 400 parts of methanol and 400 parts of water. The precipitated crystal was collected by filtration, washed successively with methanol, dilute aqueous ammonia and water, and dried to obtain 1.6 parts of a titanyl phthalocyanine crystal.

A powder X-ray diffraction pattern of the resulting titanyl phthalocyanine crystal is shown in FIG. 1.

EXAMPLE 2

Figure 2:
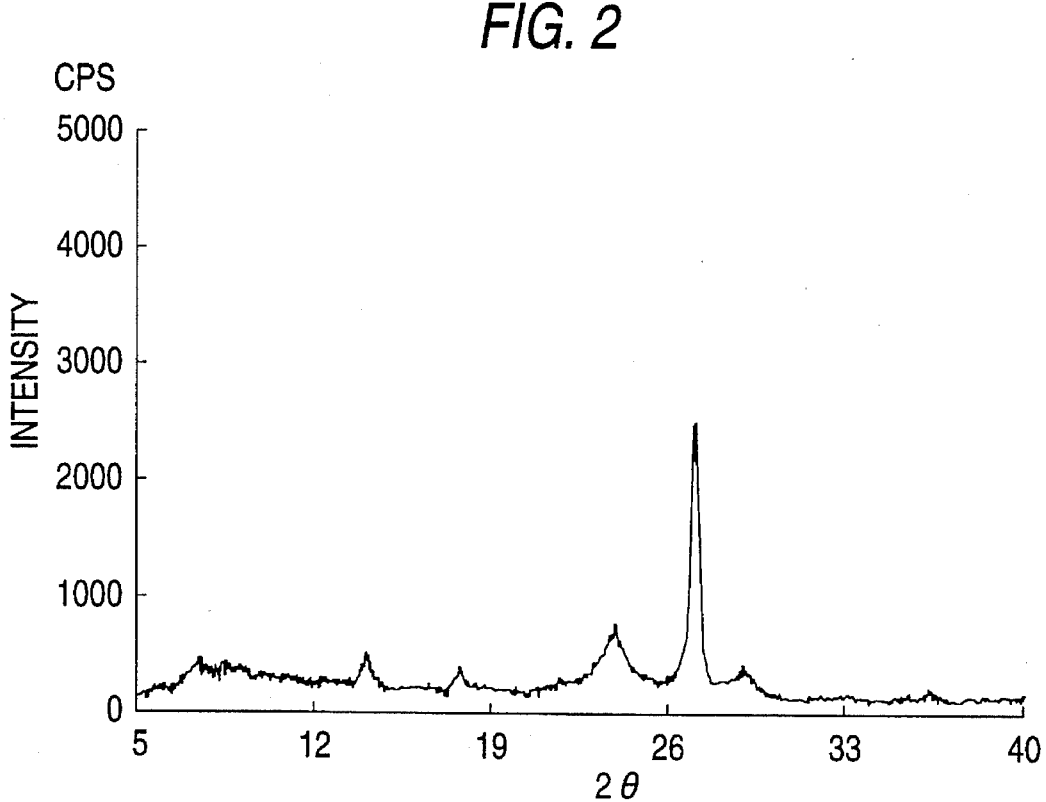

Two parts of the titanyl phthalocyanine crystal obtained in the Synthesis Example were dissolved in 60 parts of 97% sulfuric acid at 5° C., and the solution was poured into an ice-cooled mixed solvent consisting of 400 parts of methanol and 400 parts of water. The precipitated crystal was filtered, washed successively with methanol, dilute aqueous ammonia, and water, and dried to obtain 1.5 parts of a titanyl phthalocyanine crystal. A powder X-ray diffraction pattern of the resulting titanyl phthalocyanine crystal is shown in FIG. 2.

EXAMPLE 3

Figure 3:
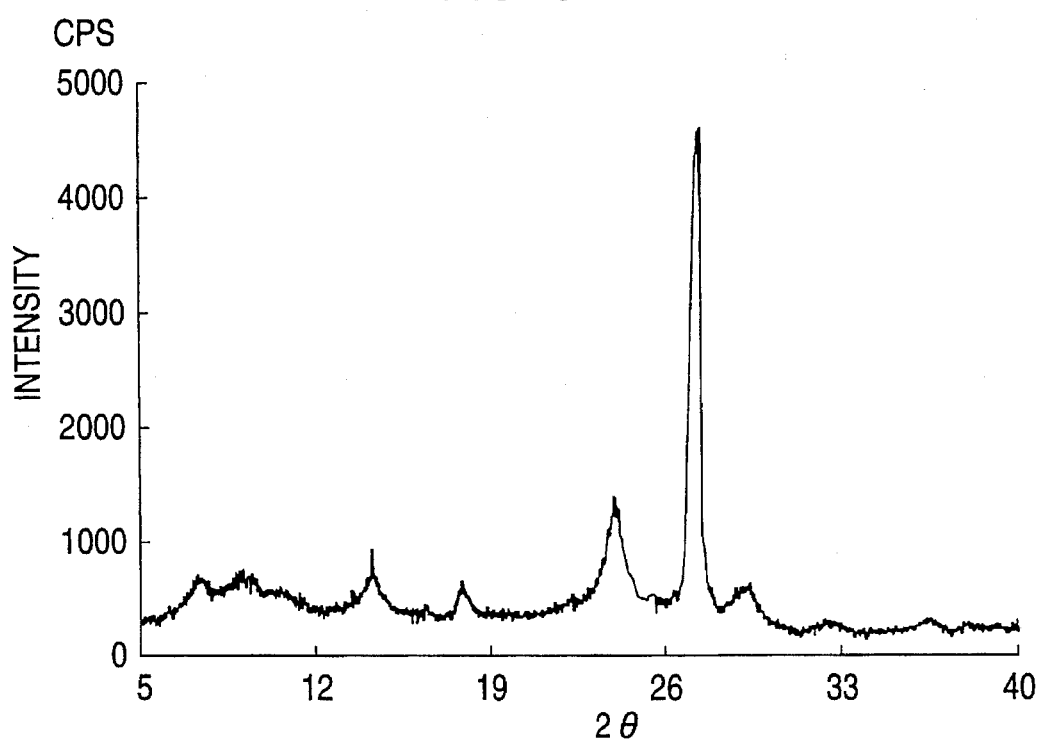

Two parts of the titanyl phthalocyanine crystal obtained in the Synthesis Example were dissolved in 100 parts of 97% sulfuric acid at 5° C., and the solution was poured into an ice-cooled mixed solvent consisting of 400 parts of toluene and 400 parts of methanol. The precipitated crystal was filtered, washed successively with methanol, dilute aqueous ammonia, and water, and dried to obtain 1.6 parts of a titanyl phthalocyanine crystal. A powder X-ray diffraction pattern of the resulting titanyl phthalocyanine crystal is shown in FIG. 3.

EXAMPLE 4

Figure 4:
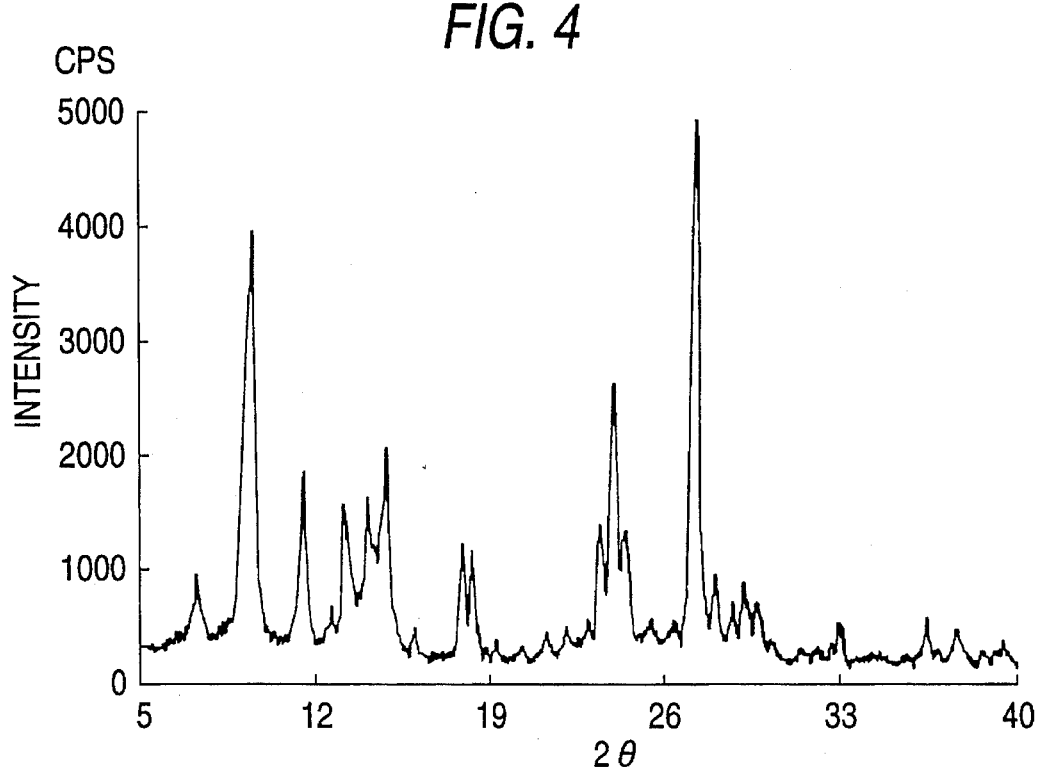

Two parts of the titanyl phthalocyanine crystal obtained in the Synthesis Example were dissolved in 100 parts of 97% sulfuric acid at 5° C., and the solution was poured into an ice-cooled mixed solvent consisting of 720 parts of water and 80 parts of monochlorobenzene. The mixture was stirred in an oil bath at 50° C. for 1 hour, followed by filtration. The collected crystal was washed successively with methanol, dilute aqueous ammonia, and water to obtain 0.8 part of a titanyl phthalocyanine crystal. A powder X-ray diffraction pattern of the resulting titanyl phthalocyanine crystal is shown in FIG. 4.

EXAMPLE 5

Figure 5:
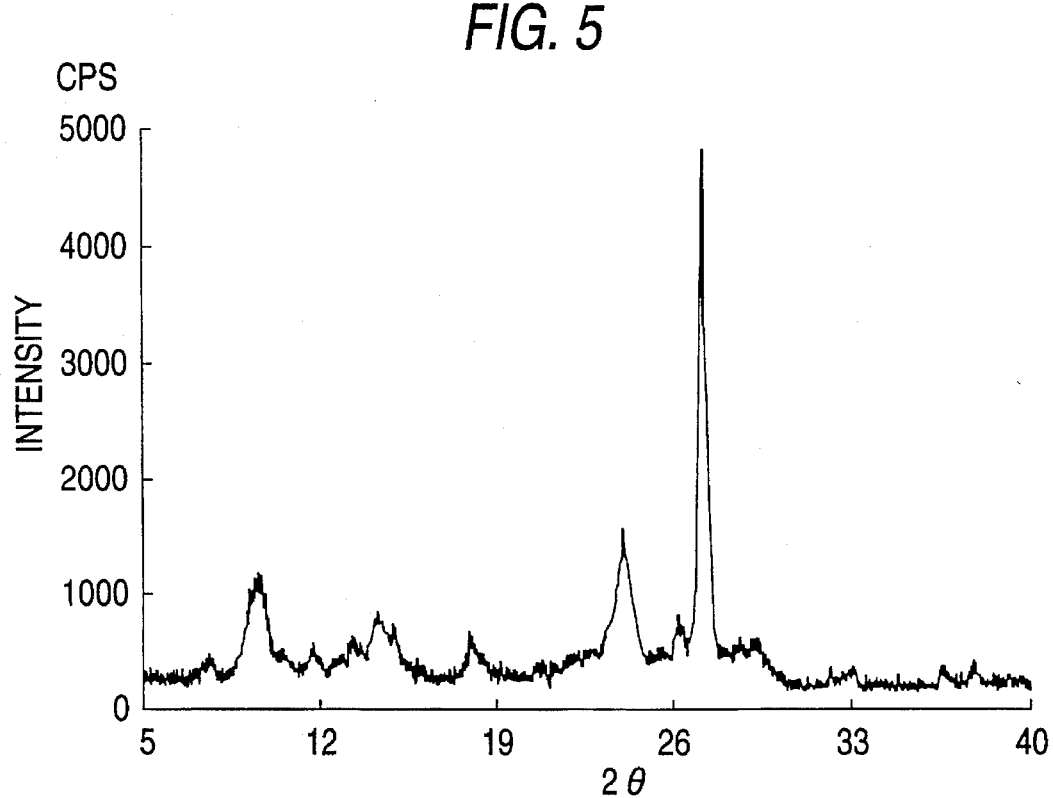

One part of the titanyl phthalocyanine crystal obtained in Example 1 was stirred in a mixed solvent consisting of 10 parts of water and 1 part of monochlorobenzene at 50° C. for 1 hour, followed by filtration. The solid was washed successively with methanol and water to obtain 0.9 part of a titanyl phthalocyanine crystal. An X-ray diffraction pattern of the resulting crystal is shown in FIG. 5.

EXAMPLE 6

Figure 6:
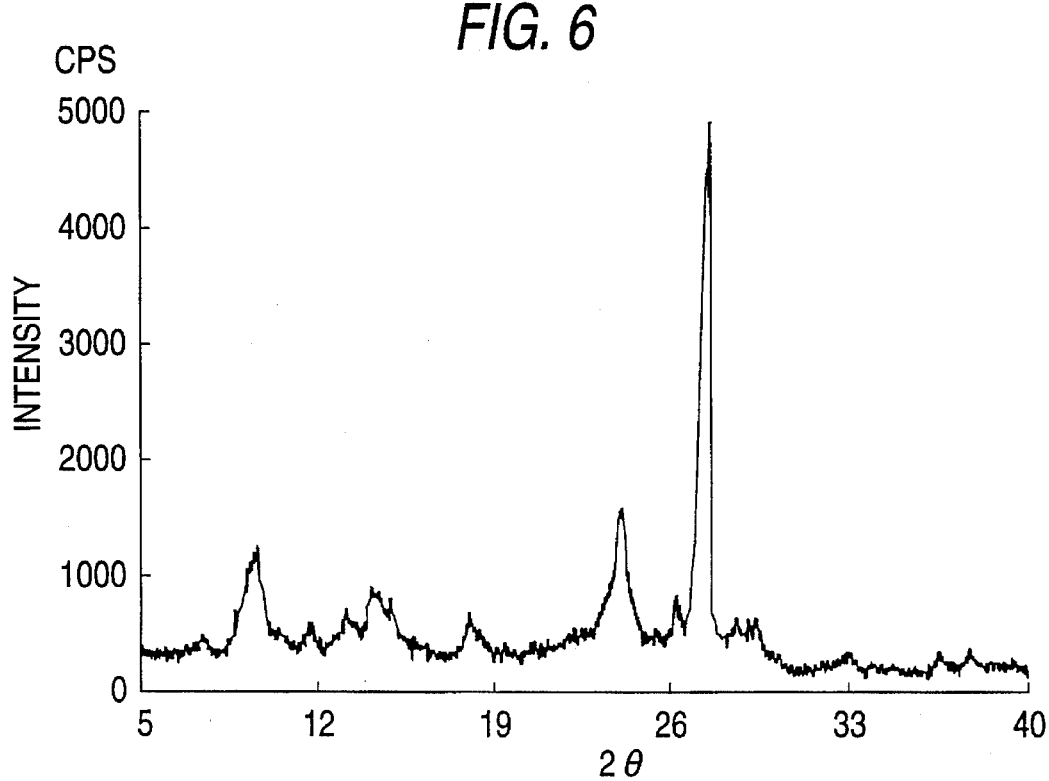

One part of the titanyl phthalocyanine crystal obtained in Example 1 was stirred in 10 parts of methanol at 50° C. for 1 hour, followed by filtration. The solid was washed successively with methanol and water to obtain 0.9 part of a titanyl phthalocyanine crystal. An X-ray diffraction pattern of the resulting crystal is shown in FIG. 6.

APPLICATION EXAMPLE

One part of the titanyl phthalocyanine crystal obtained in Example 1 was mixed with 1 part of polyvinyl butyral ("ESLEC BM-1", produced by Sekisui Chemical Co., Ltd.) and 100 parts of cyclohexanone, and the mixture was dispersed in a paint shaker together with glass beads for 1 hour. The resulting coating composition was coated on an aluminum support by dip coating and dried by heating at 100° C. for 5 minutes to form a 0.2 μm-thick charge generating layer.

In 20 parts of monochlorobenzene were dissolved 2 parts of a compound of formula:

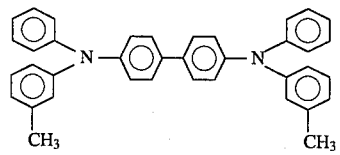

and 3 parts of poly(4,4-cyclohexylidenediphenylenecarbonate) of formula:

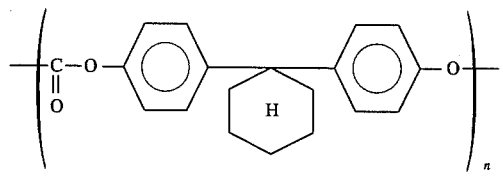

and the resulting coating composition was coated on the charge generating layer by dip coating and dried by heating at 120° C. for 1 hour to form a 20 μm-thick charge transporting layer.

The resulting electrophotographic photoreceptor was charged to −6 kV with a corona discharge in an ambient-temperature and ambient-humidity condition (20° C., 50% RH) by means of an electrostatic copying paper analyzer ("EPA-8100" manufactured by Kawaguchi Denki K.K.) and then exposed to monochromatic light (800 nm) isolated from light emitted from a tungsten lamp by a monochromator at an irradiance of 1 μW/cm$^2$. The exposure amount $E_{1/2}$ (erg/cm$^2$) necessary for the surface potential to be reduced to ½ the initial surface potential $V_0$ (V) was measured. Then, the photoreceptor was irradiated with tungsten light of 10 lux for 1 second, and a residual potential $V_R$ was measured. Further, the above-described charging and exposure were repeated 1000 times, and the same measurements of $V_0$, $E_{1/2}$, and $V_R$ were made. As a result, $V_0$=−840 V; $E_{1/2}$=1.3 erg/cm$^2$; and $V_R$=0 V. After the 1,000-time repetition of charging and exposure, $V_0$=−830 V; $E_{1/2}$=1.3 erg/cm$^2$; and $V_R$=0 V.

REFERENCE EXAMPLE

For comparison, an electrophotographic photoreceptor was prepared in the same manner as in the Application Example, except for using the titanyl phthalocyanine crystal having a powder X-ray diffraction pattern of FIG. 7 as obtained in the Synthesis Example as a charge generating material. The comparative photoreceptor was evaluated in the same manner as in Application Example. As a result, $V_0$=−780 V; $E_{1/2}$=4.1 erg/cm$^2$; and $V_R$=10 V. After the 1,000-time repetition of charging and exposure, $V_0$=−750 V; $E_{1/2}$=3.8 erg/cm$^2$; and $V_R$=15 V. The comparative photoreceptor thus proved inferior to that prepared in the Application Example.

As described above, according to the present invention, a stable crystal of titanyl phthalocyanine showing at least one diffraction pattern at a Bragg angle (2θ±0.2) of 27.3° can be obtained with ease through a very simple operation. The titanyl phthalocyanine crystal obtained by the present invention is very useful as a photoconductive material of electrophotographic photoreceptors used in printers utilizing a semiconductor laser as a light source. The electrophotographic photoreceptors using the titanyl phthalocyanine crystal of the present invention exhibit high sensitivity and excellent durability on repeated use.

While the invention has been described in detail and with reference to specific examples thereof, it will be apparent to one skilled in the art that various changes and modifications can be made therein without departing from the spirit and scope thereof.

What is claimed is:

1. A process for preparing a photoconductive titanyl phthalocyanine crystal for use in an electrophotographic photoreceptor, wherein said crystal shows at least one diffraction peak at a Bragg angle (2θ±0.2) of 27.3° and said at least one peak at a Bragg angle of 27.3° is the strongest diffraction peak, said process comprising the step of dissolving or suspending titanyl phthalocyanine in concentrated sulfuric acid to form a solution or a slurry and diluting said solution or slurry with a solvent so as to precipitate a crystal in said solvent, wherein said solvent is an alcohol solvent having up to 5 carbon atoms, an aromatic solvent, a mixed solvent of said alcohol solvent and water, a mixed solvent of said aromatic solvent and water, or a mixed solvent of said alcohol solvent and said aromatic solvent with or without water; and wherein said aromatic solvent is an aromatic hydrocarbon, an aromatic nitro compound, an aromatic halogen compound or phenol.

2. A process for preparing a photoconductive titanyl phthalocyanine crystal for use in an electrophotographic photoreceptor, wherein said crystal shows at least one diffraction peak at a Bragg angle (2θ±0.2) of 27.3° and said at least one peak at a Bragg angle of 27.3° is the strongest diffraction peak, said process comprising the steps of (a) dissolving or suspending titanyl phthalocyanine in concentrated sulfuric acid to form a solution or a slurry and diluting said solution or slurry with a solvent so as to precipitate a crystal in said solvent, wherein said solvent is an alcohol solvent having up to 5 carbon atoms, an aromatic solvent, a mixed solvent of said alcohol solvent and water, a mixed solvent of said aromatic solvent and water, or a mixed solvent of said alcohol solvent and said aromatic solvent with or without water, and (b) isolating and treating the precipitated crystal with said alcohol solvent, said aromatic solvent, a mixed solvent of said alcohol solvent and said aromatic solvent with or without water, a mixed solvent of said alcohol solvent and water, or a mixed solvent of said aromatic solvent and water; and wherein said aromatic solvent is an aromatic hydrocarbon, an aromatic nitro compound, an aromatic halogen compound or phenol.

3. A process as claimed in claim 1, wherein said concentrated sulfuric acid is used in an amount of from 1 to 100 times the weight of said titanyl phthalocyanine.

4. A process as claimed in claim 2, wherein said concentrated sulfuric acid is used in an amount of from 1 to 100 times the weight of said titanyl phthalocyanine.

5. A process as claimed in claim 1, wherein said solvent for dilution is used in an amount of from 2 to 50 times the weight of said concentrated sulfuric acid solution or slurry.

6. A process as claimed in claim 2, wherein said solvent for dilution is used in an amount of from 2 to 50 times the weight of said concentrated sulfuric acid solution or slurry.

* * * * *